July 25, 1961 H. E. FROEHLICH ET AL 2,993,663
GONDOLA ASSEMBLY
Filed April 16, 1956
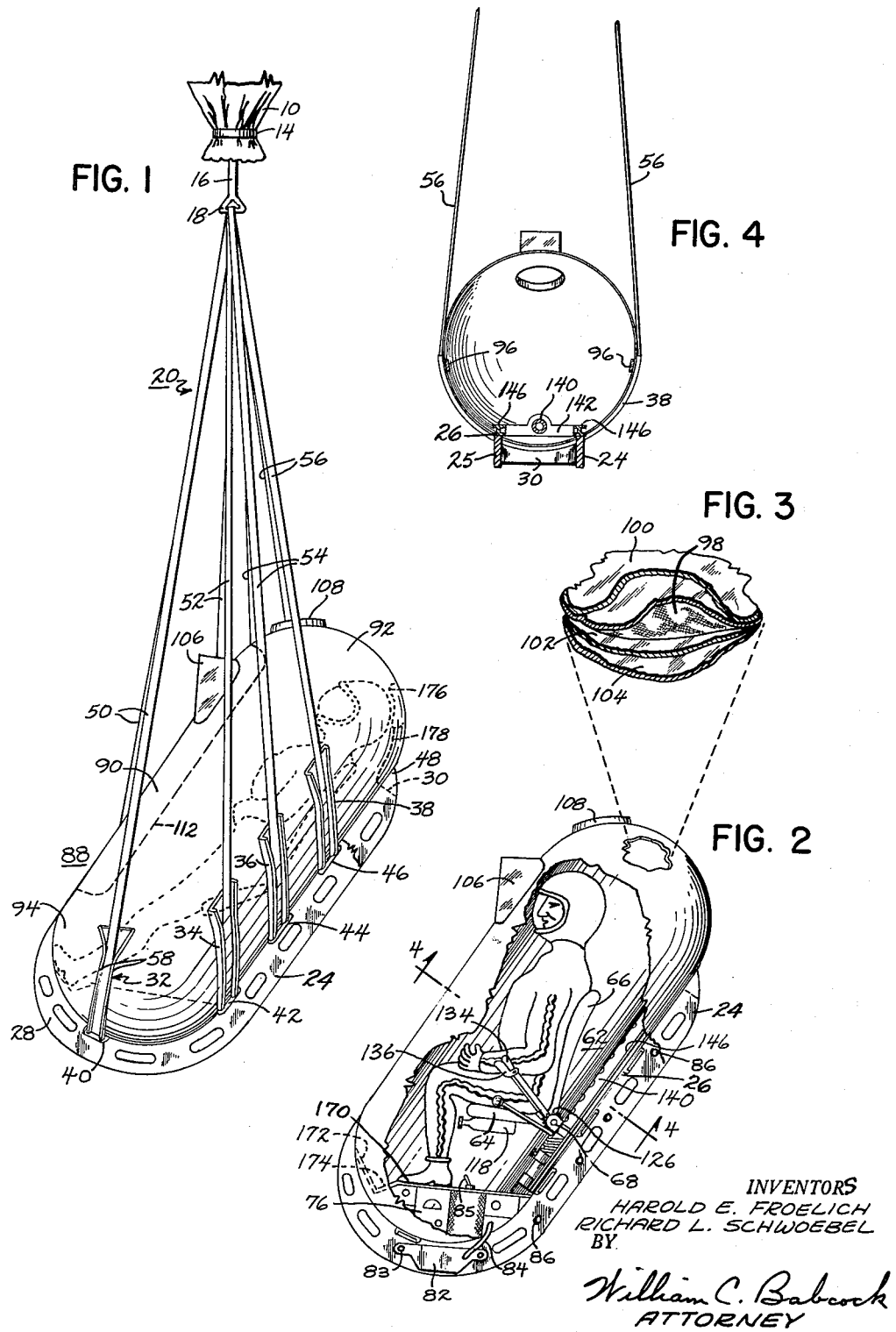
INVENTORS
HAROLD E. FROELICH
RICHARD L. SCHWOEBEL
BY
William C. Babcock
ATTORNEY

United States Patent Office 2,993,663
Patented July 25, 1961

2,993,663
GONDOLA ASSEMBLY
Harold E. Froehlich, New Brighton, and Richard L. Schwoebel, Minneapolis, Minn., assignors to General Mills, Inc., a corporation of Delaware
Filed Apr. 16, 1956, Ser. No. 578,529
10 Claims. (Cl. 244—31)

The present invention relates to balloons and more particularly to an improved balloon gondola assembly for high altitude manned flights.

In the balloon field there has been considerable activity in recent years in connection with upper atmosphere research. Balloons are known which have been utilized for free flight to altitudes in the stratosphere. In the past, these high altitude flights have been essentially limited to the transportation of small animals and instruments. While instruments can measure a number of conditions and can in suitable cases telemeter the measured information back to a ground station, there are other situations where the presence of a human operator would be desirable.

As far as we are aware, however, the possibility of successful manned flights at higher altitudes has been severely limited by a number of factors. One of the chief factors has been the lack of a suitable gondola construction to support such a passenger in safety and comfort. Known gondola constructions have previously involved a rigid shell of sufficient thickness and strength to carry the full weight of passenger and payload, as well as to provide a pressurized chamber for the passenger. Such constructions are relatively so bulky and heavy that they severely limit the altitudes and payloads which can be achieved in practice.

A gondola construction which overcomes some of the prior art problems is shown and claimed in the copending application of Richard L. Schwoebel, Serial No. 578,528, now Patent No. 2,950,881, filed of even date herewith, for "Balloon and Gondola Assembly." The novel gondola construction of that application segregates the two primary load supporting and protective functions of a gondola in separate structural elements. The present invention is directed in part to further improvement of such gondolas. The present invention is also directed to special gondola shapes designed particularly to achieve minimum weight and maximum altitude performance for a given passenger load.

It is accordingly one object of the invention to provide an improved gondola assembly for high altitude manned balloon flights.

Another object is a gondola of improved shape and angular orientation.

A further object is a gondola having an improved combination and arrangement of keel and shell members.

Other objects and advantages of the present invention will be apparent from the following specification in which certain preferred embodiments of the invention are described with particular reference to the accompanying drawings.

In the drawings, wherein like reference characters indicate like parts,

FIGURE 1 is a side view of a gondola assembly according to the invention attached to the lower end of a balloon;

FIG. 2 is a similar view with portions broken away for clearness;

FIG. 3 is an enlarged partial view of a portion of the gondola shell of FIG. 2; and FIG. 4 is a partial sectional view on the line 4—4 of FIG. 2.

The gondola assembly of the present invention is used with a balloon or lifting cell of known construction the bottom of which is shown at 10 in FIG. 1. This lower end is closed and secured at 14 by a suitable end fitting which provides a load attachment shaft 16. A loop or ring 18 at the lower end of this load attachment shaft 16 provides means for attachment of the upper ends of a plurality of suspension lines indicated generally at 20. The construction and arrangement of these suspension lines is described in detail below.

The gondola construction used to illustrate this invention is one in which the two primary functions of the gondola are separated, so that the load bearing and support function can be carried out by the use of rigid members which need serve no other purpose. Similarly the shell construction can be made of suitable materials and assembled in a fashion to provide only the protective function of a pressurized chamber with no supporting effect. In this manner an extremely light and efficient gondola construction can be achieved without loss of essential safety or protection for the operator. Certain features of the illustrated gondola construction are shown and claimed in the above copending application of Richard Schwoebel, and in the copending sole application of Froehlich, Serial No. 578,530, now U.S. Patent 2,865,581, also filed of even date herewith, for "Balloon Gondola Assembly."

As shown in FIGS. 2 and 4, and more fully described in said copending applications, the load-bearing and passenger supporting portion of the gondola includes one or more rigid body or keel members 24, 25. In this case two such keel members, 24 and 25, are provided. The members 24 and 25 are located beneath the gondola and extend longitudinally of the gondola body portion as shown at 26. The keel members also include integral curved end portions 28 adapted to extend around the lower end of the gondola body as shown. According to one feature of this invention, the gondola is inclined at an angle as shown in FIG. 2, to provide a minimum volume within which a passenger may sit. The keel members 24 and 25 extend longitudinally beneath the main body portion and lower end portion of the gondola to provide means for supporting the desired passenger and equipment inside the gondola and also to protect the lower portions of the gondola during takeoffs and landings.

As shown in FIG. 4, the two keel members 24 and 25 may be rigidly connected by appropriate cross members 30 or by other means such as the internal supporting mechanism within the gondola.

To connect the body or keel members to the suspension lines 20, a plurality of rigid projecting ribs or load attachment members 32, 34, 36 and 38 are provided. These attachment members are located at points which are spaced along the keel horizontally of each other. Thus the total weight of the gondola assembly can be distributed and carried over a plurality of regions along the length of the gondola. The respective points of attachment of members 32, 34, 36 and 38 to the body or keel members 24 and 25 are indicated at 40, 42, 44 and 46 respectively. The rib members can be suitably connected to the keel members at these points either by welding, riveting, or any other suitable manner.

As indicated in FIG. 1, the upper ends of the keel members extend at 48 to a point substantially above the final point of attachment at 46, while the lower curved end 28 of each keel member extends substantially beyond the point of attachment of the ribs 32 and 40.

The suspension lines indicated generally at 20 include a plurality of pairs of lines shown specifically at 50, 52, 54 and 56. These pairs are respectively associated with the rib members 32, 34, 36, and 38 at one end and with the load ring 18 of the lifting cell at the upper end. To maintain the suspension lines in association with the rib members, these latter members are formed of channel construction with outwardly projecting edges 58 as shown. The suspension lines themselves may be made of suitable strong flexible material such as nylon webbing, particularly when a certain degree of resilient extensibility is desired as is the case in the construction of the copending Froehlich sole application.

As indicated in FIG. 2, the gondola includes suitable passenger or pilot supporting means indicated generally at 62. The supporting means includes a seat member 64, and a back member 66 as shown in FIG. 2. The seat and back members are carried on a suitable cross shaft 68 and their relative location and positions may be adjusted as described below.

As shown in FIG. 2, the gondola assembly also includes suitable instruments indicated at 76 and a ballast unit indicated at 82. For convenience this ballast unit is secured at points 83 between the keel members 24 and 25. The construction includes means for changing or adjusting the relative position of this ballast unit to achieve the desired weight distribution along the keel members and thus assist in establishing the desired angular orientation of the gondola in a vertical plane. For this purpose the keel members include additional attachment points or openings 86 for location of the ballast unit 82 selectively at a plurality of positions along the keel. The ballast unit includes suitable connections 84 with an internal operating member 85, which can be manipulated by the passenger to release ballast as desired during control of the flight.

In high altitude balloon flights it is also essential to protect the passenger from adverse atmospheric and other conditions by some sort of enclosing shell. The shell construction may follow the principles of said copending Schwoebel application and be adapted to achieve the desired protective function with no load bearing function.

According to the present invention, the shell is formed with a special shape and orientation designed to provide the necessary internal space with minimum total size and weight. Traditional pressurized gondolas have been spherical in shape, at least partly because the sphere has a most favorable ratio of volume to surface area. We have found, however, that such a shape includes a large proportion of what might be regarded as unused volume.

Where optimum altitudes and payloads are sought, particularly with a human passenger, we have found that a gondola with a cylindrical body portion has a higher degree of useful internal space. By orientation of the longitudinal axis of such a cylinder at an angle of 30 to 60 degrees from the vertical, we can provide a shell of minimum diameter which is adapted to just enclose a single passenger, when the passenger is in upright sitting position as in FIG. 2. Moreover, by design of the length of keel and shell so they approximate the total height of the passenger, we can also provide space for the passenger to extend himself in a semi-reclining position as shown in dotted outline in FIG. 1. If a more horizontal reclining position is desired, provision can be made for adjustment of the gondola angle as in said copending Froehlich application.

The shell construction according to this invention is indicated at 88. It includes a generally cylindrical body portion 90 with integral hemispherical upper and lower end portions 92 and 94. This particular shape offers definite advantages and conveniences in construction and in the provision of optimum ratios of surface area and volume, as already described.

Because the sole function of the shell portion is the protection of the passenger and not the support of the passenger, the shell can be made of extremely light flexible fabric material. The flexible material of the shell can then be secured to the rigid keel members already described by attaching the fabric to these members in any known gastight manner. As shown in FIG. 4, the fabric shell portion is secured to the upper surfaces of the keel members 24 and 25 and to the inner surfaces of ribs 32, 34, 36 and 38. The attachment in these areas may be by suitable adhesive, or with the addition of internal clamping members as indicated at 96 in FIG. 4. The attachment to these rib and keel portions will maintain the shape of the lower portion of the shell construction, but will permit the upper portion to be completely collapsed when not in use.

The material from which the fabric shell is made should be essentially flexible and gastight. Nylon fabric is a particularly desirable material becaues of its extremely high strength to weight ratio. Suitable fabrics may be obtained, for example, which have a fabric weight of the order of .028 pound per square foot, with a fabric tensile strength of 212 pounds per inch. This gives a strength to weight ratio on the order of 90,800, which compares extremely favorably with the best available strength to weight ratios of metallic shells. The ratio for stainless steel, for example, is of the order of 54,300, and even materials such as titanium do not have a more favorable ratio than approximately 64,600.

As illustrated in FIG. 3, such nylon fabric material is preferably associated with certain additional layers or coatings to achieve the desired objectives. Here the fabric layer 98 is associated with an outer aluminum foil layer 100 and an inner aluminum foil layer 102. While these layers have been shown as separable self-sustaining layers in FIG. 4, they could obviously be applied in the form of extremely thin coatings on the respective surfaces of the nylon fabric 98. The outer foil coating serves as a reflective coating to reflect the sun's rays during daytime flight and prevent undesirable high temperatures within the gondola. The inner foil layers similarly serve to reflect heat inwardly within the gondola and thus prevent undue loss of heat during hours of darkness.

The nylon fabric 98 may itself be treated to make it substantially gastight, or it may be associated with a suitable layer of lining material such as that shown at 104. Plastic resin materials of the polyethylene type are particularly suitable for the construction of such liners.

The use of materials such as those described provides a flexible lightweight gondola shell construction with the necessary gasproof and heat insulating characteristics for high altitude balloon flights. This fabric shell is attached to the rigid load-bearing and supporting portions of the gondola as described above. The shell and associated keel members are preferably attached to each other along a line corresponding to an element of the cylindrical body with the shell above the keel.

As stated above, these parts may be longitudinally dimensioned just slightly larger than the height of the passenger. Similarly, the diameter of the cylindrical shell portion can be kept relatively small, i.e. of the order of less than four feet in diameter, to provide an enclosing chamber of minimum size for the operator, but in which limited movement can take place. The shell includes suitable ports 106, 108, through which the operator can observe the external conditions during flight. Here the fabric shell also includes convenient access and escape means in the form of an opening controlled by a gasproof zipper 112 or equivalent construction.

The supporting seat 62 of FIG. 2 may include means to support the passenger selectively in the positions of FIGS. 1 and 2. For example, an operating handle 134 may be used to adjust the angular orientation of one of the seat and back members 64, 66. A release lever 136 on the operating handle 134 controls the position of a locking pawl which in turn cooperates with a fixed gear 126 to maintain the desired angular position. The other supporting member can be similarly controlled by a lever (not shown) on the opposite side of the pilot, as more fully described in said copending Froehlich application. Means may also be provided as shown in said application for longitudinal adjustment of the position of the seat and back members as a unit along the keel member. For this purpose, the seat members and cross shaft 68, with associated parts may be adjusted longitudinally on a fixed rod or shaft 140. This shaft, or support, 140 is carried by cross members such as 142 secured to inner frame members 146. These inner frame members are directly supported by the keel members in rigid load-bearing relationship.

In the position of FIG. 2 the operator's feet rest on a horizontally disposed platform portion 170 and the seat and back members 64 and 66 are angularly oriented to hold the passenger in an upright sitting position. In this position the operator is comfortably supported for observation of external conditions and for control of the appropriate instruments, ballast units, and other items such as pressure control unit 118 as mentioned in the above copending Schwoebel application.

In the position of FIG. 1, the operator may extend his feet to the angularly oriented portions 172 and 174 of the lower platform. These portions are oriented so that the lower legs of the operator can be supported in a substantially extended position approximately parallel to the gondola axis. As the operator extends his body into this semi-reclining position, he may adjust the seat assembly for maximum comfort.

As described in said copending Schwoebel application, the keel and supporting seat structure carry the full weight of the passenger and transmit that load through the attachment means to the balloon lifting cell independently of the shell member. The size and strength of the keel member may be designed substantially equal to that required to support the desired passenger load, and specifically only a single passenger where that is the desired load, under parachute loadings or shocks transmitted through the attachment means to the keel of an order of magnitude of 10 to 15 "g" with a safety factor of at least 2, where "g" is the acceleration due to gravity.

For the operator's further convenience in this reclining position, a head rest 176 is provided an an extension 178 of the internal framing member and keel construction.

The gondola assembly just described substantially accomplishes the objectives set forth at the beginning of this application and provides an improved device for supporting a passenger for high altitude flights. This gondola assembly is particularly desirable for flights adapted to carry a single passenger to maximum altitude. Since many variations and changes in the exact details of construction will be apparent to persons skilled in this field, it is intended that this invention shall cover all such changes and modifications as fall within the spirit and scope of the attached claims.

Now, therefore, we claim:

1. A balloon gondola for high-altitude manned flight comprising a shell having a generally cylindrical body portion, means for supporting a passenger within said shell, and means for attachment of said supporting means and shell to a lifting cell, said attachment means having a construction maintaining said shell with the longitudinal axis of said cylinder inclined at an angle in the range from substantially 30 to 60 degrees from the vertical.

2. A balloon assembly for high altitude manned flight comprising a gondola having a rigid keel member, support means on said keel for carrying a passenger with his body extending along and above the keel, shell means providing a light cylindrical gastight chamber above said keel adapted to enclose completely a passenger on said support, a lifting cell, and load bearing means suspending said gondola beneath said lifting cell, said load-bearing means being connected to said keel member and suspending said cylindrical gastight chamber at an acute angle to both the vertical axis of the lifting cell and a horizontal plane with the head of the passenger adjacent the higher end of said chamber.

3. A balloon assembly according to claim 2 in which said load-bearing means suspends said chamber at an angle in the range of 30 to 60 degrees to the vertical axis of the balloon.

4. A balloon gondola assembly for high altitude manned flight comprising a rigid keel member, support means on said keel for carrying a passenger with his body extending along and above the keel, shell means providing a light cylindrical gastight chamber above said keel adapted to enclose completely a passenger on said support, and load-bearing means for suspending said gondola beneath a lifting cell, said load-bearing means being connected to said keel member and having a construction and location maintaining said cylindrical gastight chamber at an acute angle to both the vertical axis of the lifting cell and a horizontal plane with the head of the passenger at the higher end of said chamber.

5. A balloon gondola assembly according to claim 4 in which said keel member has a curved extension projecting from its lower end beneath the lower end of said shell and providing a ground-engaging keel portion during launching and landing.

6. A balloon gondola according to claim 5 including an additional keel member, said two keel members being spaced horizontally from each other, the additional keel member having a curved extension, said spaced keel members providing a rocking support for at least partially supporting the gondola on the ground and for limited rocking movement during landing impacts.

7. A balloon gondola according to claim 4 in which said keel member includes a plurality of rigid laterally projecting ribs extending partially around the lower portion of the normal circumference of said shell, said load-bearing means being connected to said ribs.

8. A gondola according to claim 7 in which a portion of said shell is secured to said projecting ribs, thereby holding said shell partially distended when the interior of the shell is unpressurized.

9. A balloon gondola for high altitude manned flight comprising a rigid elongated keel member, support means for carrying a passenger on said keel with the body of the passenger extending longitudinally along the keel, a flexible and substantially collapsible fabric shell providing a gastight chamber having closeable passenger ingress and egress means enclosing a passenger on said support, said shell having a generally cylindrical body portion and hemispherical end portions and being secured to said keel substantially along an element of said cylindrical body portion, the length of said cylindrical body portion being slightly less than said passenger height and the diameter of said body portion being less than four feet, and means for attaching said keel to a lifting cell.

10. A balloon gondola for high altitude manned flight comprising a shell having a generally cylindrical body portion, means for supporting a passenger within said shell, said support means including means having a construction and location selectively supporting said passenger in a semi-reclining position, and means for attachment of said supporting means and shell to a lifting cell, said attachment means having a construction maintaining said shell with the longitudinal axis of said cylinder inclined at an angle in the range from substantially 30 to 60 degrees from the vertical.

References Cited in the file of this patent

UNITED STATES PATENTS

| 1,511,489 | Armstrong | Oct. 14, 1924 |
| 2,865,581 | Froehlich | Dec. 23, 1958 |

FOREIGN PATENTS

| 141,970 | Great Britain | Apr. 29, 1920 |
| 740,158 | Great Britain | Nov. 9, 1955 |